United States Patent
Dotson et al.

(10) Patent No.: US 11,235,555 B2
(45) Date of Patent: Feb. 1, 2022

(54) POLYMERIC SURFACING FILM HAVING DOUBLE OUTLINE DEFINING GEOMETRIC SHAPES THEREIN

(71) Applicant: 3M INNOVATIVE PROPERTIES COMPANY, St. Paul, MN (US)

(72) Inventors: Bradley J. Dotson, Edmonds, WA (US); Michael J. Beaver, Catonsville, MD (US); David A. Benz, Taneytown, MD (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/494,939

(22) PCT Filed: Jul. 27, 2018

(86) PCT No.: PCT/US2018/044241
§ 371 (c)(1),
(2) Date: Sep. 17, 2019

(87) PCT Pub. No.: WO2019/027846
PCT Pub. Date: Feb. 7, 2019

(65) Prior Publication Data
US 2020/0282700 A1   Sep. 10, 2020

Related U.S. Application Data

(60) Provisional application No. 62/635,766, filed on Feb. 27, 2018, provisional application No. 62/539,353, filed on Jul. 31, 2017.

(51) Int. Cl.
*B32B 7/12* (2006.01)
*B26D 3/08* (2006.01)
(Continued)

(52) U.S. Cl.
CPC ............. *B32B 7/12* (2013.01); *B26D 3/085* (2013.01); *B32B 7/06* (2013.01); *G09F 3/02* (2013.01);
(Continued)

(58) Field of Classification Search
CPC ......... B32B 7/12; B32B 7/06; B32B 2605/00; B26D 3/085; G09F 3/02; G09F 3/10; G09F 2003/0222; Y10T 428/14
See application file for complete search history.

(56) References Cited

U.S. PATENT DOCUMENTS 4,397,261 A * 8/1983 Jones .................... B05C 17/06
                                                        118/505
6,383,644 B2   5/2002 Fuchs
(Continued)

FOREIGN PATENT DOCUMENTS

WO   WO 2002-072351   9/2002

OTHER PUBLICATIONS

International Search Report for PCT International Application No. PCT/US2018/044241, dated Oct. 30, 2018, 4 pages.

*Primary Examiner* — Patricia L. Nordmeyer
(74) *Attorney, Agent, or Firm* — Philip P. Soo

(57) ABSTRACT

According to various examples, an assembly can include a backing. The assembly can also include a polymeric surfacing film adhered to the backing, the polymeric surfacing film. The polymeric surfacing film can include a first geometric shape. The polymeric surfacing film includes a continuous first cut defining the geometric shape and a continuous second cut spaced apart from and substantially congruent with the continuous first cut in at least one of an x and y direction. A portion of the polymeric surfacing film, located between the first cut and the second cut, is removable from the backing. According to some examples, the (Continued)

assembly can provide certain benefits over state of the art assemblies. For example, according to some examples, providing the first and second cut can make removal of at least the first geometric shape to be quicker and easier, which can result in significant savings in time and wasted materials.

9 Claims, 11 Drawing Sheets

(51) Int. Cl.
     *B32B 7/06*      (2019.01)
     *G09F 3/02*      (2006.01)
     *G09F 3/10*      (2006.01)

(52) U.S. Cl.
     CPC ............ *G09F 3/10* (2013.01); *B32B 2605/00* (2013.01); *G09F 2003/0222* (2013.01); *Y10T 428/14* (2015.01)

(56) References Cited

U.S. PATENT DOCUMENTS

| | | | |
|---|---|---|---|
| 6,607,831 B2 | 8/2003 | Ho | |
| 7,079,916 B2 | 7/2006 | Stimpson | |
| 7,873,434 B2 | 1/2011 | Pape | |
| 8,323,761 B2 * | 12/2012 | Nakayama | G11B 7/26 428/40.1 |
| 2003/0228436 A1 * | 12/2003 | Ishimura | A61L 15/58 428/42.3 |
| 2007/0100490 A1 | 5/2007 | Hartt | |
| 2007/0240548 A1 | 10/2007 | Pape | |

\* cited by examiner

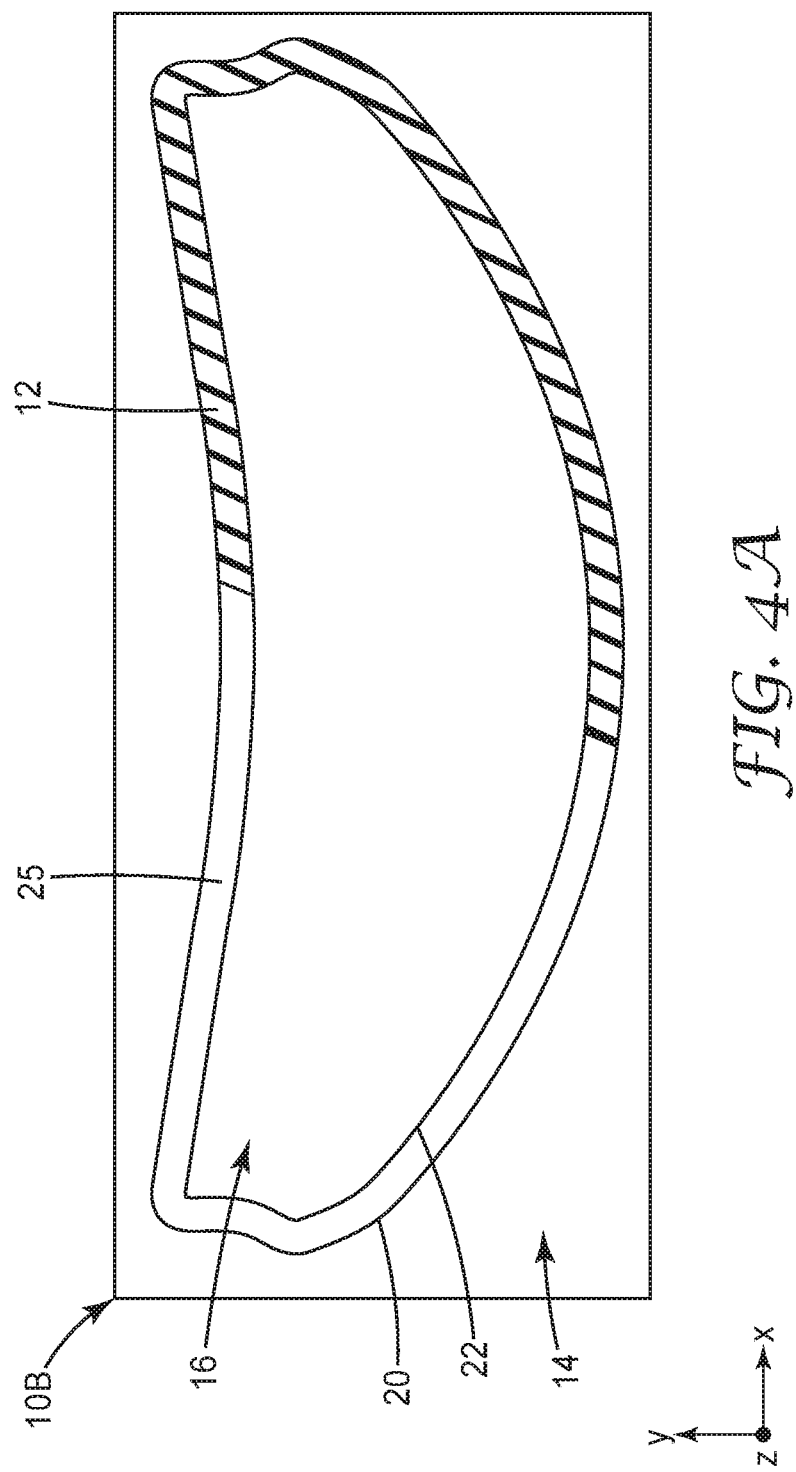

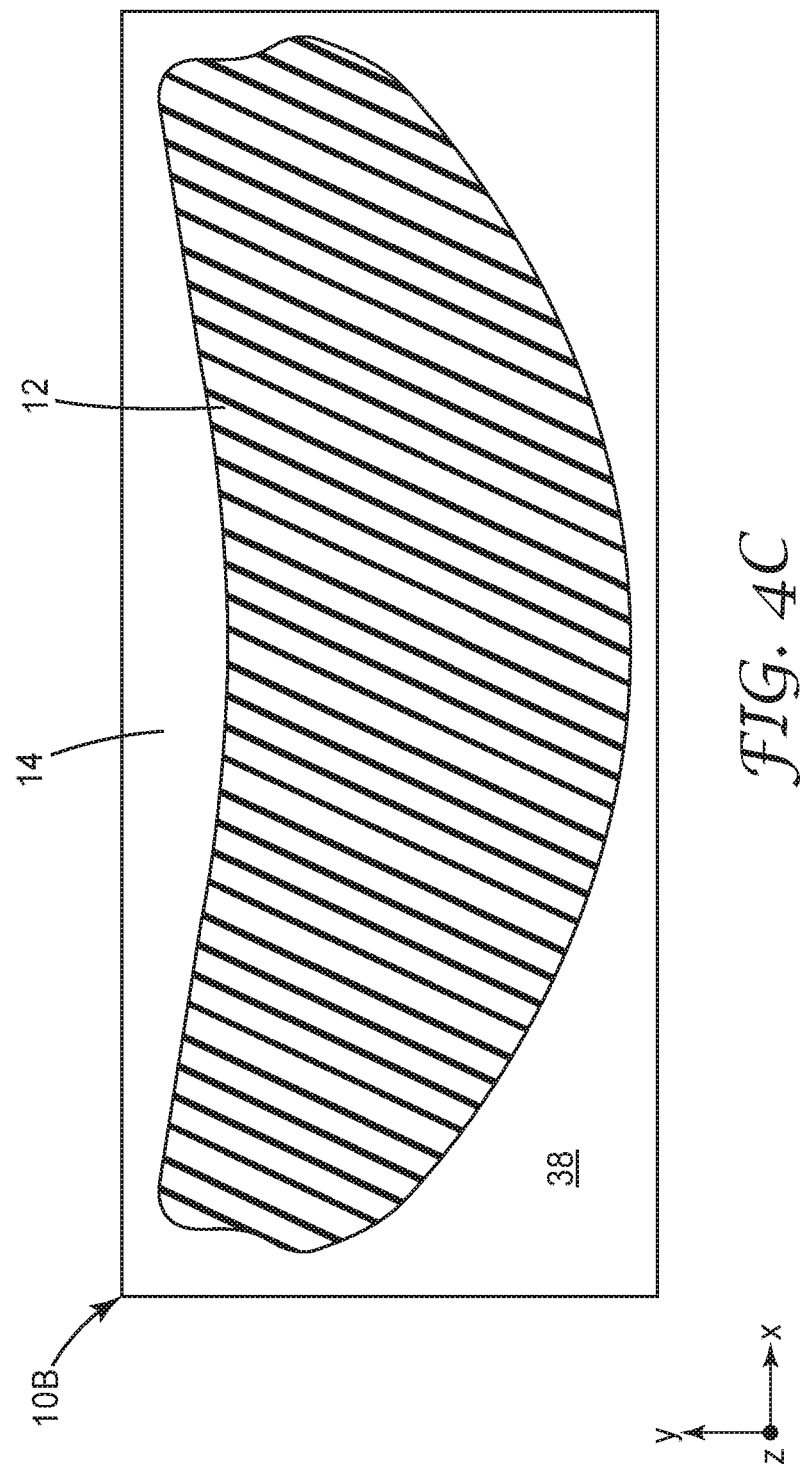

POLYMERIC SURFACING FILM HAVING DOUBLE OUTLINE DEFINING GEOMETRIC SHAPES THEREIN

CROSS REFERENCE TO RELATED APPLICATIONS

This application is a national stage filing under 35 U.S.C. 371 of PCT/US2018/044241, filed Jul. 27, 2018, which claims the benefit of U.S. Provisional Patent Application No. 62/539,353, filed Jul. 31, 2017 and U.S. Provisional Patent Application No. 62/635,766, filed Feb. 27, 2018, the disclosures of which are incorporated by reference in their entirety herein.

BACKGROUND

Polymeric surfacing films can be used to protect a surface from damage. For example, a polymeric surfacing film can be used to protect a painted surface of a vehicle from debris that would otherwise directly impact the surface during operation of the vehicle. In producing a polymeric surfacing film, a sheet of the film can have a specific geometric shape cut into the sheet. The geometric shape defines a polymeric sheet that is subsequently removed from a backing and applied to the surface.

SUMMARY OF THE DISCLOSURE

According to various examples, an assembly can include a backing. The assembly can also include a polymeric surfacing film adhered to the backing, the polymeric surfacing film. The polymeric surfacing film can include a first geometric shape. The polymeric surfacing film includes a continuous first cut defining the geometric shape and a continuous second cut spaced apart from and substantially congruent with the continuous first cut in at least one of an x and y direction. A portion of the polymeric surfacing film, located between the first cut and the second cut, is removable from the backing.

According to various examples, a method of making an assembly is disclosed. The assembly can include a backing. The assembly can also include a polymeric surfacing film adhered to the backing. The polymeric surfacing film can include a continuous first cut defining a first geometric shape and a continuous second cut spaced apart from and substantially congruent with the continuous first cut in at least one of an x and y direction. A portion of the polymeric surfacing film, located between the first cut and the second cut, is removable from the backing. The method can include providing or receiving the polymeric surfacing film. The method can further include cutting the polymeric surfacing film along a first perimeter of the geometric shape. The method can further include cutting the polymeric surfacing film along a second perimeter spaced apart and substantially congruent with the first perimeter.

According to various examples, a method of using an assembly is disclosed. The assembly can include a backing. The assembly can also include a polymeric surfacing film adhered to the backing. The polymeric surfacing film can include a continuous first cut defining a first geometric shape and a continuous second cut spaced apart from and substantially congruent with the continuous first cut in at least one of an x and y direction. A portion of the polymeric surfacing film, located between the first cut and the second cut, is removable from the backing. The steps of the method can include providing or receiving the assembly. The method can further include removing the portion of the polymeric surfacing film located between the first cut and the second cut of the first geometric shape from the backing.

According to various examples, a method implemented by a computer processor for cutting a two-dimensional film and forming an assembly can include selecting a pattern from a pattern data source. The pattern can include a continuous first perimeter defining a first geometric shape. The pattern can further include a continuous second perimeter spaced apart from and substantially congruent with the continuous first perimeter in at least one of an x and y direction. The method can further include issuing at least one command to a cutter to cut each of the one or more geometric shapes along each of the first perimeter and second perimeter in the two-dimensional film.

According to various examples, a system can include a memory. The system can further include a processor coupled to the memory. The memory can include instructions. When the instructions are performed by the processor, the processor performs operations including selecting a pattern from a pattern data source. The pattern includes a continuous first perimeter defining a first geometric shape and a continuous second perimeter spaced apart from and substantially congruent with the continuous first perimeter in at least one of an x and y direction. The system further includes a cutter adapted to receive a command issued by the processor for cutting each of the one or more geometric shapes along each of the first perimeter and second perimeter in a two-dimensional film.

This process of removing excess film from the desired polymeric film is known in the art as "weeding." It is generally desirable to remove the excess film from the polymeric sheet shortly after the geometric shape is cut into polymeric surfacing film because the cut surfaces of certain surfacing films have a tendency to self-heal soon after the cut is made. Delay in, or failure to perform, weeding can result in desired portions of the polymeric film lifting off simultaneously with the excess film, which is undesirable. As a further problem, desired portions of the polymeric film can be very small in area and/or fragile relative to the excess film, making these desired portions vulnerable to tearing during the w eeding process, thus rendering those portions unusable.

Some of the embodiments presented herein include benefits over the current state of the art, at least some of which are unexpected. For example, according to current state of the art protective film assemblies, removing a geometric sheet disposed therein can be difficult and time consuming. This can be because manually removing excess film by cutting it from the polymeric sheet requires care and skill on the part of a user. However, including a second cut, or second perimeter that becomes a second cut, allows for quick and easy release of the polymeric surfacing film that surrounds a geometric shape from the backing. This can allow the user to realize significant savings in time. This is because the resulting shape between the two continuous cuts is a thin strip or skirt of polymeric surfacing film which peels easily from the backing and surrounding polymeric surfacing film. Removal of the thin strip creates a sufficient gap between the desired shape and the remaining polymeric film on the backing. Additionally, once the thin strip is removed, there is substantially less liklihood of the film self-healing and the desired shape can be used when convenient for the user. Accoridng to various examples, if multiple polymeric shapes are cut in close proximity on a single sheet, the user can then separate the parts into individual pieces complete with their respective backing by use of a knife. The contrast provided by the areas where the thin strip of polymeric film were removed makes it easier to cut the pieces apart because the user can now see the desired shapes and are less likely to accidentally damage them with the knife.

Additionally, according to various examples, significant savings in time can be realized as opposed to manually weeding excess material with a knife. For example, when a user weeds excess film manually, the user must carefully cut around the boundaries of the geometric shapes. This can be time consuming in many ways. For example, the shape itself may be large. The shape or shapes may be intricate, and cutting excess film may require skill and care in order to avoid damage. The skill and care required of the user can add time to the weeding process. However, the cutter machine of the present invention can quickly and accurately make the first cut and the second cut which allows the user the simply peel the excess film from around the first geometric shape, thus, freeing the user of the need to manually cut the same excess film. The increased time savings can, moreover, help the user to mitigate the adverse effects of the film self-healing after being cut.

According to some embodiments, including the second cut can result in significant savings in materials. For example, in some cases a polymeric surfacing film comes off a cutter as a sheet with one cut defining the geometric shape. The portion of the film that does not define the geometric shape can be reused after the geometric shape is cut out. However, if a user removes the sheet from the cutter, and then weeds the excess film around the geometric shape, then all film on the sheet, except the desired geometric shape is disposed of. This weeding process can also damage the desired geometric shape by accidental tearing of the polymeric film as mentioned previously. In contrast, according to some embodiments, adding the second cut can minimize the amount of wasted excess material. This can be due to the substantial elimination of the need to manually weed excess film as described herein. This can also be due to the ability to position the first cut and the second cut very close to each other. Positioning the first cut and the second cut close to each other can function to minimize the amount of film that is removed during weeding while maximizing the amount of film that remains after weeding and removal of the first geometric shape. The remaining film can be reused, as opposed to being rendered useless and disposed.

Moreover, according to some embodiments, material and time can be saved where multiple geometric shapes are included in the film. This is because the ability to precisely form a second cut around each geometric shape allows the geometric shapes to be placed very close to each other. This maximizes the amount of unused and undamaged film on the sheet. In contrast, if excess film for each shape was required to be manually weeded, the geometric shapes would have to be spaced comparatively further apart to provide a tolerance for the user in cutting around each shape.

According to some embodiments, a further benefit is that the user can easily customize the second cut. For example, the user can have the second cut be completely congruent with the first cut. Alternatively, the user can alter the second cut to include at least one incongruent portion. The incongruent portion can constitute a tab that the user can pull to initiate removal. The incongruent portion can also constitute a merger between second cuts around adjacent geometric shapes such that the shapes are surrounded by one continuous second cut. Thus, only one weeding step can be required for the adjacent shapes. According to some embodiments, the user can also customize the spacing between the first and second cut to provide a customized visual contrast between the first and second cuts. For example, the first and second cuts can be placed a distance apart from each other that makes it easier for a user to see the two cuts as opposed to the first cut and second cut being so close that they cannot be perceived. As another example, the widths of the actual cuts can be customized in order to provide a customized visual contrast between the first and second cuts. For example, the first cut can be wider than the second cut, with the cuts being relatively close to each other the difference in width can make the cuts more noticeable to the user thereby making the geometric shape easier to see on the film.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 4A is top view of another protective film assembly showing a skirt partially removed from around a geometric shape, in accordance with various embodiments.

FIG. 4C is a top view of the protective film assembly of FIGS. 4A and 4B, which a first geometric shape removed, in accordance with various embodiments.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Protective Film Assembly

Figure 1:
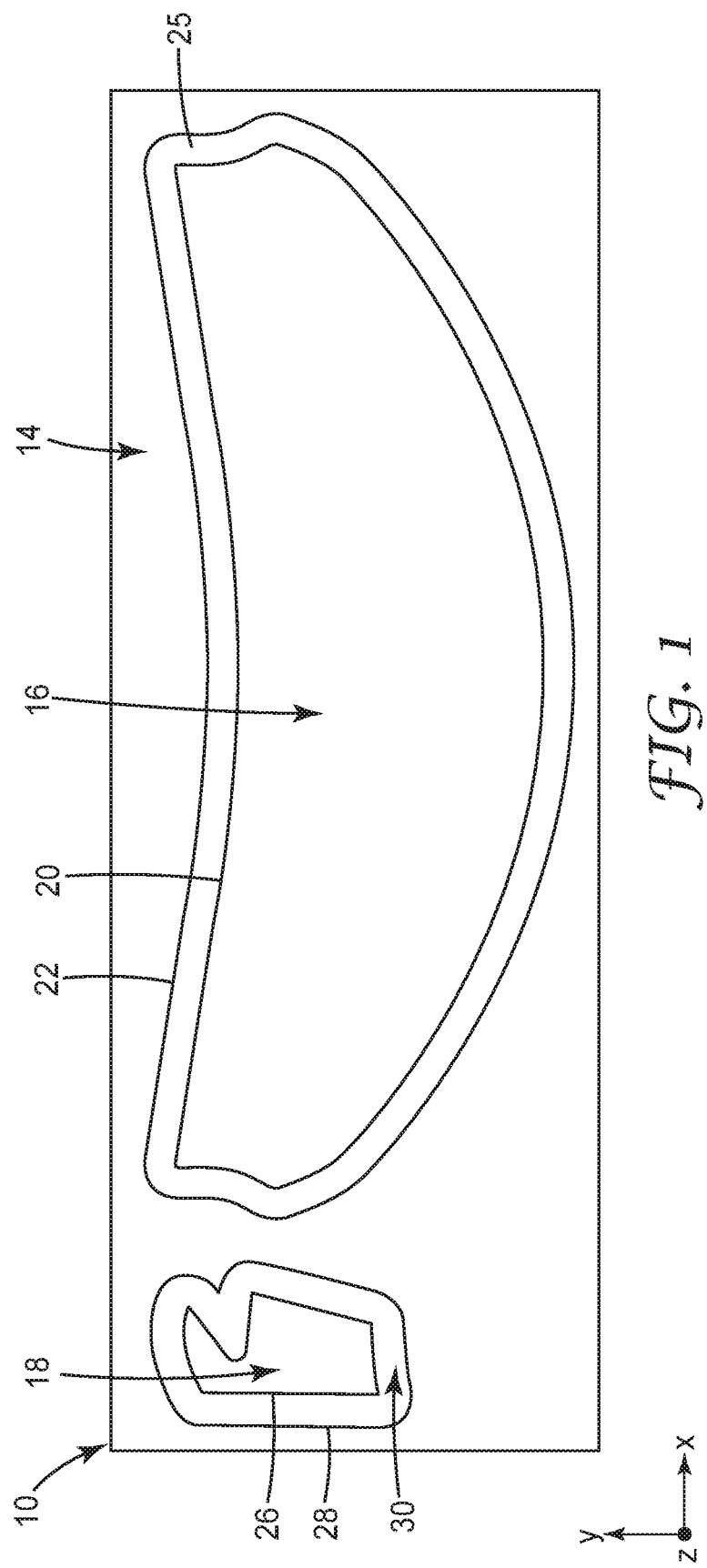
FIG. 1 is a top view of a protective film assembly, in accordance with various embodiments.
Figure 2:
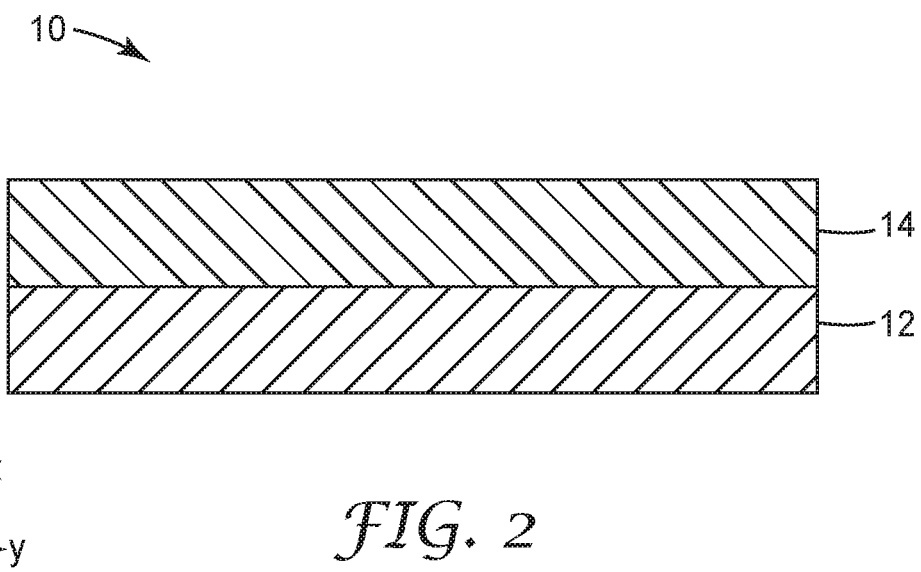
FIG. 2 is a side view of the protective film assembly of FIG. 1, in accordance with various embodiments.

FIG. 1 is a top plan view of protective film assembly 10. FIG. 2 is a side view of protective film assembly 10, FIGS. 1 and 2 show many of the same components and will be discussed concurrently. As shown in FIGS. 1 and 2, protective film assembly 10 includes backing 12 and polymeric surfacing film 14. Backing 12 (shown in FIG. 2) is releasably attached to polymeric surfacing film 14. Backing 12 can function to give protective film assembly 10 a sufficient stiffness such that the shape of assembly 10 can be retained during subsequent cutting. Backing 12 can include many suitable materials. For example, backing 12 can include a paper product or a polyolefin. In some examples, an adhesive can be applied to polymeric surfacing film 14, which can ultimately help to secure polymeric surfacing film 14 to a substrate. Backing 12 can help to protect the adhesive during storage and handling of protective film assembly 10 before polymeric surfacing film 14 is applied to a substrate. The assembly can also include a cap sheet, which is a protective layer on top of polymeric surfacing film 14, opposite of backing 12. If present the cap sheet can be removed prior to any cutting of polymeric surfacing film 14. The cap sheet can be adhered to polymeric surfacing film 14 through a static attraction.

Examples of polyolefins include polyethylene or polypropylene. The polyethylene can be a high density polyethylene or a low density polyethylene. Backing 12 can optionally include a release coating applied between backing 12 and polymeric surfacing film 14. The release coating can help enable clean peeling of the backing 12 and polymeric surfacing film 14 from each other. The release coating can include a polysiloxane.

Polymeric surfacing film 14 includes one or more polymers. The one or more polymers are chosen from polymers that can allow polymeric surfacing film 14 to have suitable properties such as good transparency and toughness. Examples of suitable polymers include polyurethanes. Suitable polyurethanes can include commercially available polyurethanes or any derived polyurethane. Examples of polymeric surfacing films 14 including commercially available polyurethanes include those used in Scotchgard Pro Series Paint Protection Film manufactured by 3M Company in St. Paul Minn., Scotchgard SGH6 paint protection film manufactured by 3M Company in St. Paul Minn., Venture shield Paint Protection Film manufactured by 3M Company in St. Paul Minn. Additional polyurethanes can be derived from the reaction of polyester or polyether diols with diisocyanates and optionally also from the further reaction of such components with chain-extending agents such as low molecular weight polyols, such as diols, or with diamines to form urea linkages. Multilayered polymeric surfacing films may also be used, as described in U.S. Pat. No. 6,607,831 (Ho et al.) and U.S. Pat. No. 6,383,644 (Fuchs). It can be desirable for polymeric surfacing film 14 to be transparent so that a surface can be covered yet it will be difficult to perceive that a surface is covered. Alternatively, the transparency of surfacing film 14 can be reduced for window tinting applications. Toughness is generally desired so that polymeric surfacing film 14 can withstand debris or other damage causing materials impacting polymeric surfacing film 14. In various embodiments, the polymeric surfacing film 14 is at least partially self-healing.

As shown in FIG. 1, polymeric surfacing film 14 includes first geometric shape 16 and second geometric shape 18. Although only first geometric shape 16 and second geometric shape 18 are shown, it is within the scope of this disclosure for additional geometric shapes to be included in polymeric surfacing film 14. As described further herein, first geometric shape 16 and second geometric shape 18 are ultimately removed from backing 12 and applied to a surface or a substrate.

First geometric shape 16 is defined by continuous first cut 20. Polymeric surfacing film 14 further includes continuous second cut 22. Continuous second cut 22 is larger and spaced apart from first cut 20, such that the first cut 20 is nested within the second cut 22. Second cut 22 is also substantially congruent with continuous first cut 20 in at least one of an x and y direction (as shown in the axis of FIG. 1) such that first cut 20 and second cut 22 have substantially the same shape. As used herein "congruent" refers to the extent that the profile of first cut 20 and second cut 22, or any other pair of cuts, match each other in shape. For example, in FIG. 1, first cut 20 and second cut 22 are essentially 100% congruent. In other examples, as discussed further herein, at least one of first cut 20 and second cut 22 can include an incongruent portion. The incongruent portion can cause at least one of first cut 20 and second cut 22 to be about 80% congruent to about 99% congruent, about 75% congruent to about 85% congruent, or less than, equal to, or greater than about 80% congruent, 85, 90, 95, or 99% congruent.

The spacing between first cut 20 and second cut 22 can be constant or variable. With respect to each other, first cut 20 and second cut 22 can be spaced at a range from about 0.5 mm to about 20 mm apart, about 1.5 mm to about 12 mm apart, or less than, equal to, or greater than about 0.5 mm, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 mm apart. The extent to which first cut 20 and second cut 22 can penetrate assembly 10 can vary. For example, backing 12 can be free of penetration by at least one of the first cut and the second cut. Alternatively, backing 12 can be at least partially penetrated by at least one of first cut 20 and second cut 22.

In some embodiments, it is possible for a user to input a negative spacing, or "offset," whereby the perimeter of a given geometric shape is reduced. Such reduction may be in a congruent or non-congruent manner. A negative offset would produce a second cut that is smaller than the first cut. This can enable the user to trim back the size of a customized film section conveniently and without need for manual manipulation. Advantageously, this feature provides a useful margin around a given film section, which can enable room for the film to stretch into place, assist in flattening wrinkled film areas, and avoid overhang during installation.

The first and second cuts can be limited to outer boundaries of a film section, but need not be. For the reasons set out above, it can be advantageous to implement a negative offset for interior boundaries representing negative space captured within a given geometric shape. Such a situation may be encountered in automotive fog light cut outs, sensors or fully surrounded grilles. In some embodiments, this negative space can be used to nest one or more additional smaller geometric shapes to save material and avoid waste.

Referring again to FIG. 1, polymeric surfacing film 14 further includes skirt 25. Skirt 25 is located between first cut 20 and second cut 22. Skirt 25 is independently removable from backing 12. As described further herein, removing skirt 25 from backing 12 can help in making the removal of first geometric shape 16 from backing easier.

Second geometric shape 18 includes third cut 26, which defines second geometric shape 18 and fourth cut 28 spaced apart from and substantially congruent with the first cut. Third cut 26 and fourth cut 28 can be spaced similarly to first cut 20 and second cut 22. Skirt 30 is located between third cut 26 and fourth cut 28. In order to minimize the amount of unused polymeric surfacing film 14 first and second geometric shapes 16 and 18 can be located as close to each other as possible. For example, second cut 22 and fourth cut 28 can be located adjacent to each other, with minimal separation therebetween. Additionally, in some examples, second cut 22 and fourth cut 28 can overlap with each other. When second cut 22 and fourth cut 28 overlap, the cuts intersect and become a continuous cut that surrounds first geometric shape 16 and second geometric shape 18. The continuous cut is substantially congruent with first cut 20 and second cut 22 aside from the intersecting portion. If the cuts intersect as described above, the skirt defined between the respective first cut 20, third cut 26, and intersecting outer cuts, is continuous and removable as one piece.

First geometric shape 16 and second geometric shape 18 are formed from polymeric surfacing film 14. Polymeric surfacing film 14 can be many different types of polymeric surfacing films that are suited for many different types of applications. For example, polymeric surfacing film 14 can be a paint protection polymeric surfacing film or a window tint polymeric surfacing film.

Figure 3:
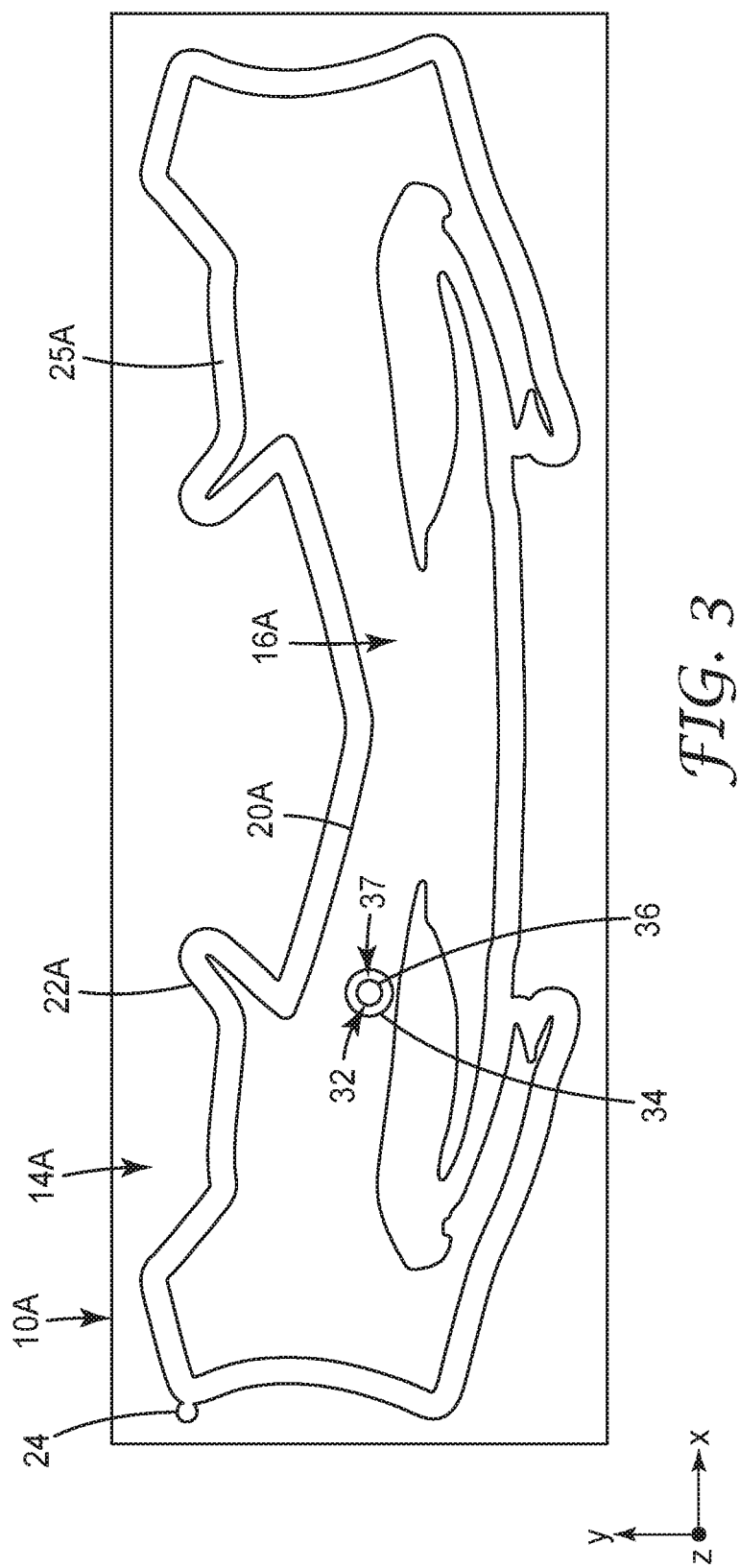
FIG. 3 is a top view of another example of a protective film assembly, in accordance with various embodiments.

FIG. 3 is a top view of protective film assembly 10A, which includes a surfacing film 14A and skirt 25A defined between first and second cuts 20A, 22A, respectively. As shown, second cut 22A includes incongruent portion 24. Incongruent portion 24 does not match the shape of first cut 20A. Incongruent portion 24 can define a shape such as a tab. Additionally, first geometric shape 16A includes interior feature 32. Interior feature 32 is located within first geometric shape 16A. Interior feature 32 can define a cut-out within first geometric shape 16A. Interior feature 32 can defined by a continuous fifth cut 34. Continuous sixth cut 36 is substantially congruent with fifth cut 34 and can be spaced from fifth cut 34 in a manner similar to first cut 20 and second cut 22, but located inside the geometric feature so as not to affect the final shape of first geometric shape 16A. Skirt 37 is defined between fifth cut 34 and sixth cut 36 and can be removed from backing 12.

Use of Protective Film Assembly

Figure 4B:
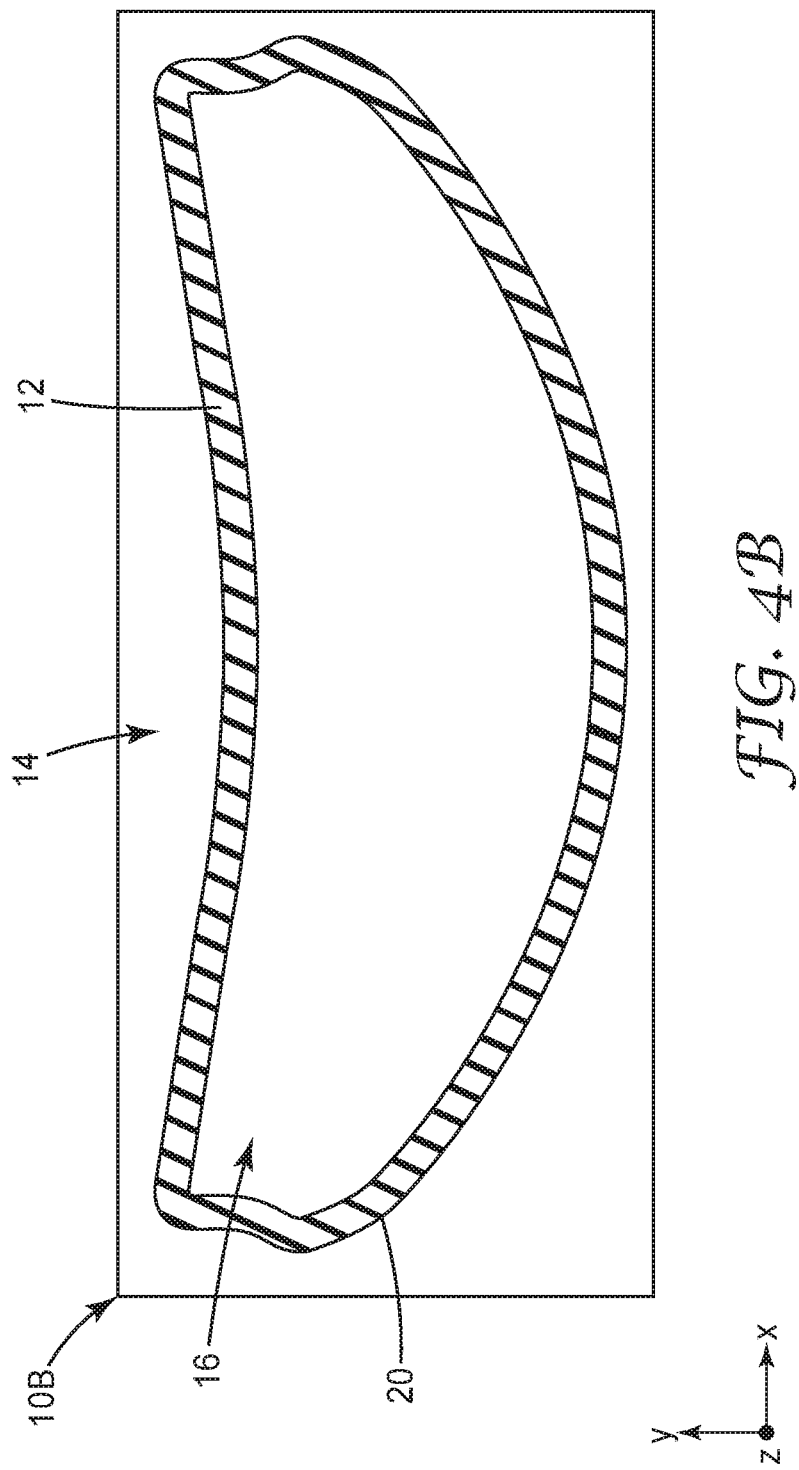
FIG. 4B is a top view of the protective film assembly of FIG. 4A showing the skirt fully removed, in accordance with various embodiments.

In operation, to use protective film assembly 10, skirt 25 is removed from backing 12. This process can be referred to as a weeding process in which spatial separation is created between polymeric surfacing film 14 and first geometric shape 16. This process is shown in part by FIG. 4A which is a top view of assembly 10B. For simplicity, FIG. 4A only shows first geometric shape 16. FIG. 4A shows skirt 25 partially removed. FIG. 4B is a top view of assembly 10B showing skirt 25 fully removed. To remove skirt 25 a user simply peels skirt 25 from backing 12. The user can be aided in removing skirt 25 if second cut 22 includes a tab. If skirt 25 includes a tab, the user can initially separate the tab from the backing 12, which can then be used as a handle that facilitates peeling skirt 25 from backing 12 in one continuous motion. Removing skirt 25 exposes first geometric shape 16, improving visibility and access to first geometric shape 16 to assist in its removal from backing 12. First geometric shape 16 can be removed from backing 12 by peeling.

FIG. 4C is a top view of protective film assembly 10B with first geometric shape 16 and skirt 25 removed. As shown, assembly 10 includes unused portion 38 of polymeric surfacing film 14. Throughout the weeding process, unused portion 38 remains substantially intact and free of damage. Thus, unused portion 38 can be reused. For example, unused portion 38 can be cut to form further geometric shapes or simply removed and applied directly to a surface. Advantageously, the overall area of unused portion 38 represents a substantial portion of polymeric surfacing film 14 that extends beyond first geometric shape 16. For example, unused portion 38 can represent at least 80%, at least 90%, at least 95%, or in some embodiments less than, equal to, or greater than 80%, 81, 82, 83, 84, 85, 86, 87, 88, 89, 90, 91, 92, 93, 94, 95, 96, 97, 98, 99, 99.5, or 99.9% of polymeric surfacing film 14 extending beyond first geometric shape 16.

This weeding process is in direct contrast to conventional weeding processes. For example, in conventional weeding processes, a protective film assembly 10 is produced that includes a geometric shape defined by a single cut and is free of a continuous second cut spaced apart from and substantially congruent with the first cut. To gain access to the geometric shape, the user must weed everything except the cut geometric shape or shapes from the assembly and then, if desired, cut the backing to separate the geometric shapes into separate pieces still attached to their respective backing. This weeding process can be very time consuming by comparison, due in part to the precision and care required by the user during weeding. Additionally, this weeding process can result in damage and waste to the unused polymeric surfacing film rending it unsuitable for further use. For example, when the desired portion of the film is small in area relative to the undesired portion of the film, it is common for the desired portion to be lifted up along with the undesired portion during the weeding process. It is also possible for a user to stray from an ideal cut line and unintentionally include an undesired portion of the polymeric surfacing film or exclude a desired portion of the polymeric surfacing film. Additionally, cutting through the backing and removing the polymeric surfacing material and backing associated with the first geometric shape can result in the distribution of forces caused by the polymeric surfacing material's tendency to curl to be redistributed which can cause the remaining polymeric surface material to curl.

After first geometric shape 16 is removed, it is applied to a substrate. First geometric shape 16 can be cut to precisely match the dimensions of any desired substrate. The substrate, as an example, can be a vehicle body, a window, or a portion thereof. As shown in FIGS. 4A-4C, first geometric shape 16 is shaped to cover a portion of an automobile hood. First geometric shape 16 can be sized to precisely fit a portion of a hood for a specific make and model of an automobile. In addition to a hood, first geometric shape 16 can be cut to confirm to other features of an automobile such as a fender, a mirror, a door, a roof, a panel, a portion thereof.

First geometric shape 16 can also be sized to precisely fit a portion of a water vessel such as a hull (e.g., to protect the hull during beaching), a transom (e.g., to protect the transom from damage caused by water skis), or a bulwark (e.g., to prevent damage caused by lines). Additionally, first geometric shape 16 can be applied to aerospace vehicles such as an airplane or helicopter. For example, first geometric shape 16 can be applied to a blade such as a propeller blade (e.g., to protect against debris strikes such as ice), an airfoil (e.g., a wing or a helicopter blade), or a fuselage.

Method of Making Protective Film Assembly

Protective assembly 10 can be formed according to many suitable methods. To form assembly 10, polymeric surfacing film 14 is adhered to backing 12. Backing 12 and polymeric surfacing film 14 can be coextruded and pressed together. Alternatively, an adhesive coating can be applied to either of backing 12 or polymeric surfacing film 14, which are then pressed against each other.

Figure 5:
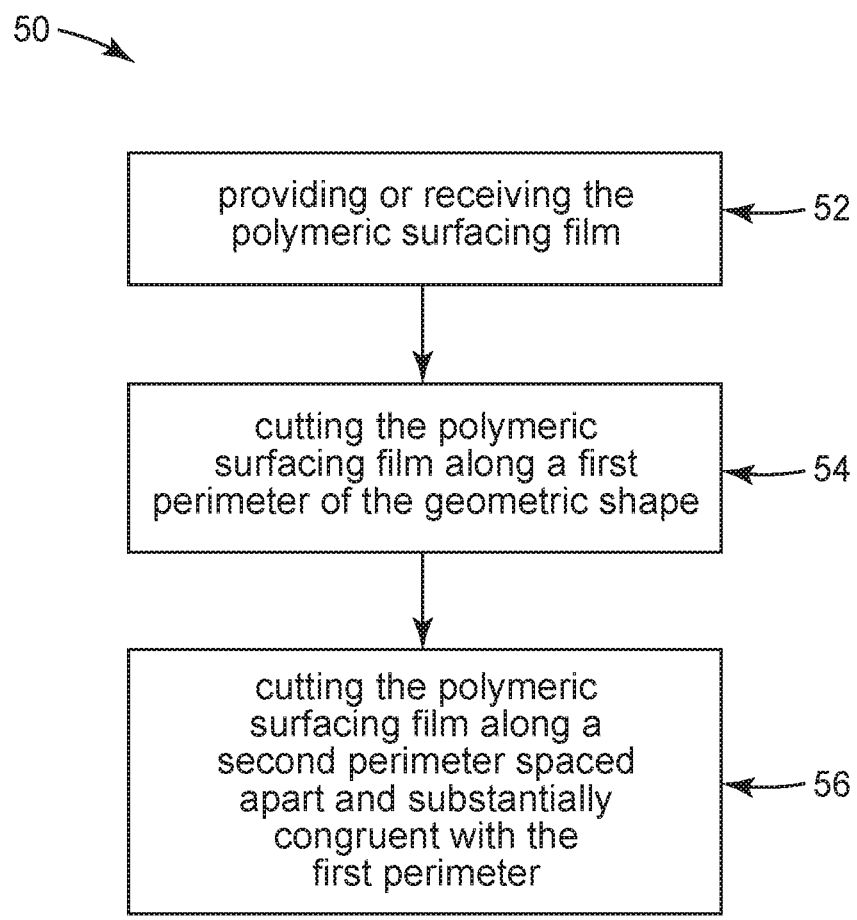
FIG. 5 is a flow chart generally illustrating a method of forming an assembly, in accordance with various embodiments.

FIG. 5 is a flow chart generally illustrating method 50 of forming assembly 10. The method includes operation 52. Operation 52 includes providing or receiving polymeric surfacing film 14 adhered to backing 12, this is an uncut assembly precursor. The assembly precursor is then placed in a cutter machine. In some examples the cutter machine can also be referred to as a plotter. The cutter machine has at least one blade that adapted to cut polymeric surfacing film 14 according to a pattern. The assembly precursor can be iteratively fed through the cutter, going backward and forward. Operation 54 includes cutting the polymeric surfacing film 14 along a first perimeter defining first geometric shape 16. At operation 54, polymeric surfacing film 14, and optionally a portion of backing 12, defining first cut 20 along the first perimeter is cut by cutter. Operation 56 includes cutting the polymeric surfacing film 14 along a second perimeter spaced apart from and substantially congruent with the first perimeter. At operation 56, polymeric surfacing film 14, and optionally a portion of backing 12, defining second cut 22 along the first perimeter is cut by the cutter. In some examples, operation 54 can occur before operation 56. Conversely, in some examples, operation 56 can occur before operation 54.

Method 50 can be implemented, in part, by a computer processor. The computer processor can be coupled to a memory that includes instructions that are readable by the computer processor which cause it to perform the operations of method 50. The instructions can generally include the components of a computer-aided design program. The user of the program or software is able to select patterns that are ultimately cut in polymeric surfacing film 14.

Figure 6A:
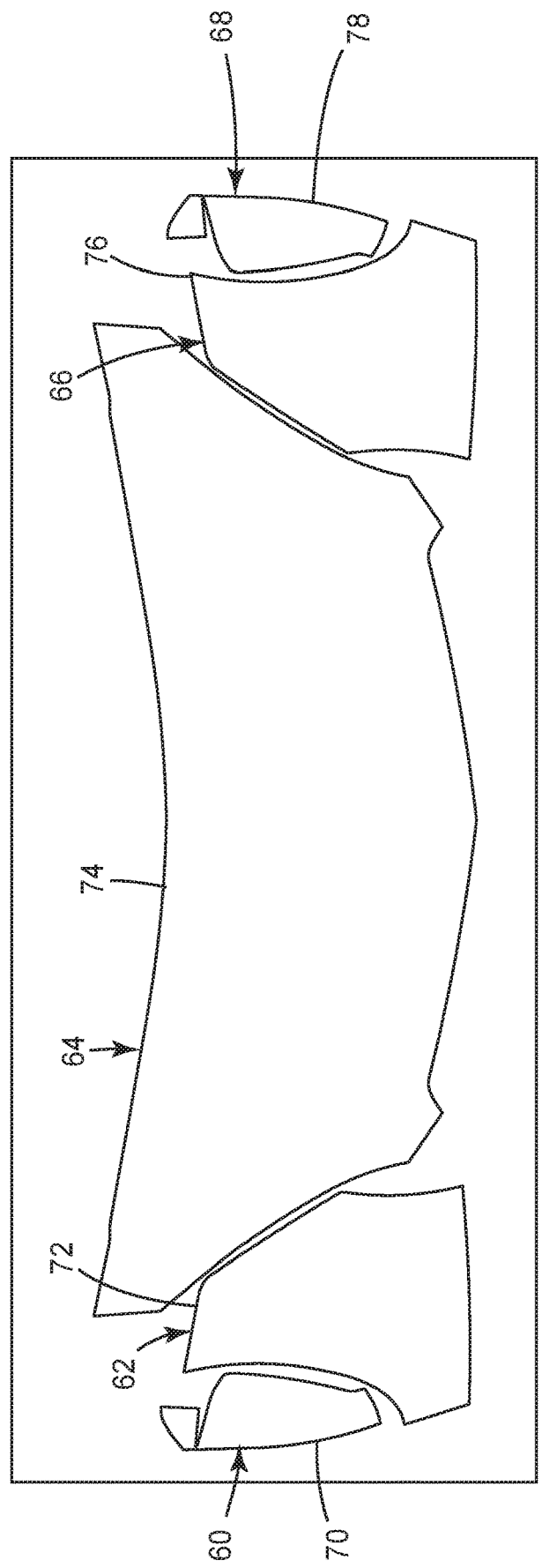
FIG. 6A is a schematic diagram showing a plurality of geometric shapes outlined on a computer screen representing a polymeric film, in accordance with various embodiments.

FIGS. 6A-6D are schematic representations of screenshots showing the process available to the user to select the patterns to be cut by the cutter. FIG. 6A shows third geometric shape 60, fourth geometric shape 62, fifth geometric shape 64, sixth geometric shape 66, and seventh geometric shape 68, which are displayed on a computer window. The boundaries of the window correlate to the size of polymeric surfacing film 14. Third geometric shape 60 and seventh geometric shape 68 correlate to mirror polymeric surfacing film; fourth geometric shape 62 and sixth geometric shape 66 correlate to fender polymeric surfacing films, and fifth geometric shape 64 correlates to a hood polymeric surfacing film. Third geometric shape 60 is defined by third perimeter 70, fourth geometric shape 62 is defined by fourth perimeter 72, fifth geometric shape 64 is defined by fifth perimeter 74, sixth geometric shape 66 is defined by sixth perimeter 76, and seventh geometric shape 68 is defined by seventh perimeter 78. Each geometric shape and perimeter is preloaded in the program and can be generated by selecting a specific make and model of a vehicle. The program can be updated periodically to include new shapes that can, for example, correspond to newer makes and models of the vehicle.

Figure 6B:
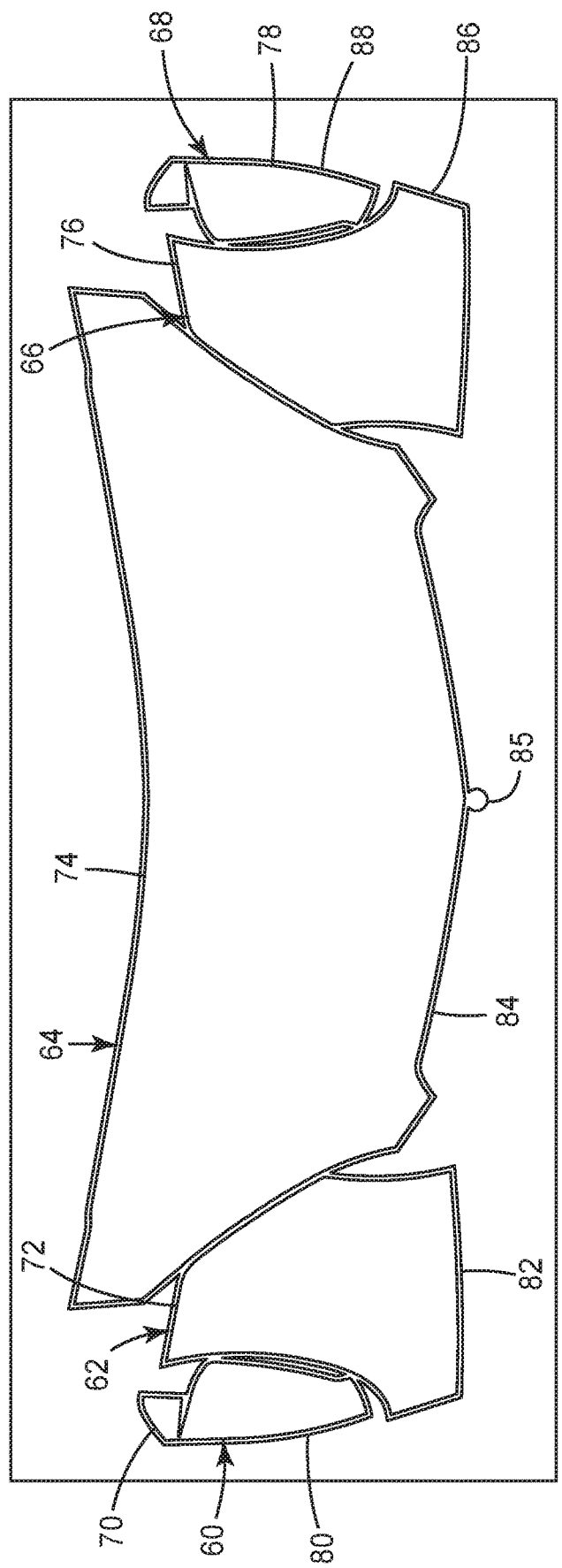
FIG. 6B is a schematic diagram showing the plurality of geometric shapes of FIG. 6A each having an additional outline, in accordance with various embodiments.

FIG. 6B shows geometric shapes 60-68 each with an additional perimeter spaced apart from and substantially congruent with perimeters 70-78. As shown, eighth perimeter 80 is spaced apart from and substantially congruent with third perimeter 70; ninth perimeter 82 is spaced apart from and substantially congruent with fourth perimeter 72, tenth perimeter 84 is spaced apart from and substantially congruent with fifth perimeter 74, eleventh perimeter 86 is spaced apart from and substantially congruent with sixth perimeter 76, and twelfth perimeter 88 is spaced apart from and substantially congruent with seventh perimeter 78. FIG. 6B further shows tab 85, which defines an incongruent portion of tenth perimeter 84. Any of perimeters 70-78 can be generated manually or automatically. Some perimeters such as tenth perimeter 84 and eleventh perimeter 86 can be merged. For example, the user or processor can issue a command to generate the continuous second perimeter following selecting the pattern. Alternatively, each pattern can be stored in the program or memory with perimeters 70-88 preloaded such that perimeters 80-88 are automatically generated upon selection of the pattern.

In this computer-implemented method, the offset between the first and second cuts associated with a given geometric shape can be defined by clicking and dragging shape boundaries using a pointing device such a mouse or trackpad. Alternatively, the offset can be specified by entering a numeric value. A negative offset, used to shrink the perimeter of a film section, could be specified by simply entering a negative number in this numeric field.

Figure 6C:
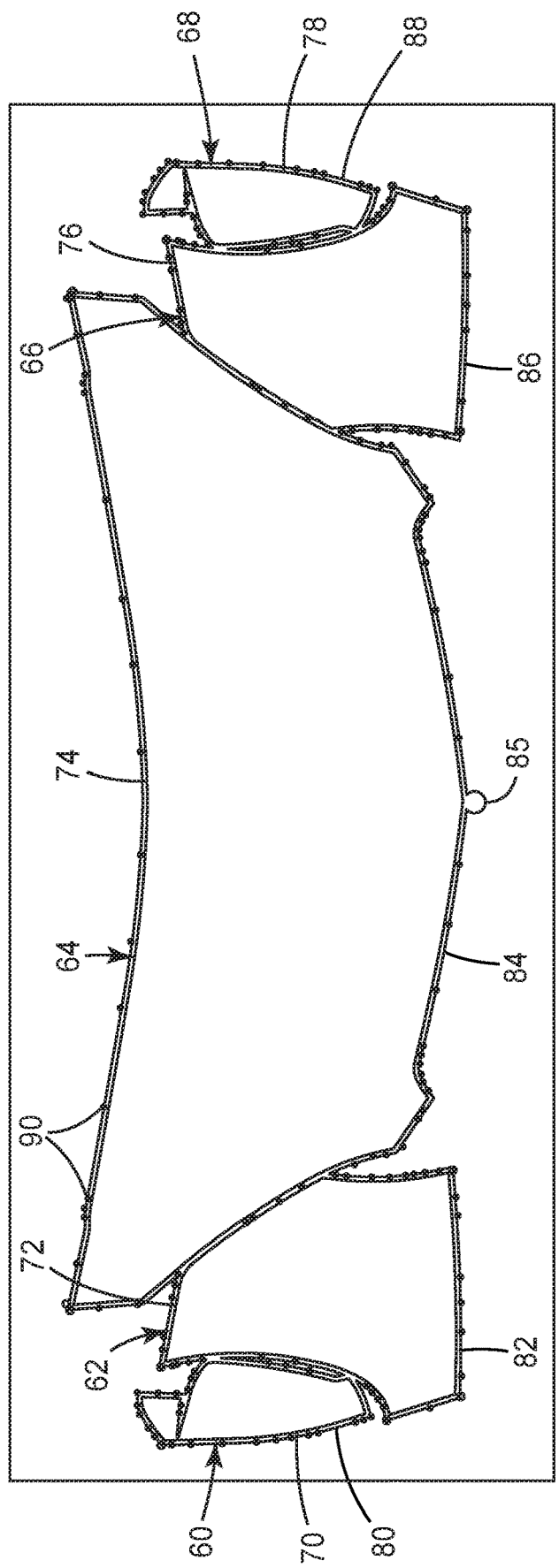
FIG. 6C is a schematic diagram showing the plurality of geometric shapes of FIG. 6B, having a plurality of tags associated with each additional outline, in accordance with various embodiments.

The arrangement of any of perimeters 70-88 or geometric shapes 60-68 can be modified by the user on the computer display. For example, as shown in FIG. 6C perimeters 80-88 can have a plurality of tags 90 dispersed thereon. The user can engage any of tags 90 and manipulate the arrangement of perimeters 80-88. In this manner the spacing between adjacent perimeters can be controlled. Further, if any of perimeters 80-88 are close to each other the user can select them and merge the perimeters to form an overlap section. Additionally, the user can create incongruent portions in any of perimeters 80-88, which can ultimately form a tab. An incongruent portion can also be preloaded into the program so that the user does not have to manually create one.

Figure 6D:
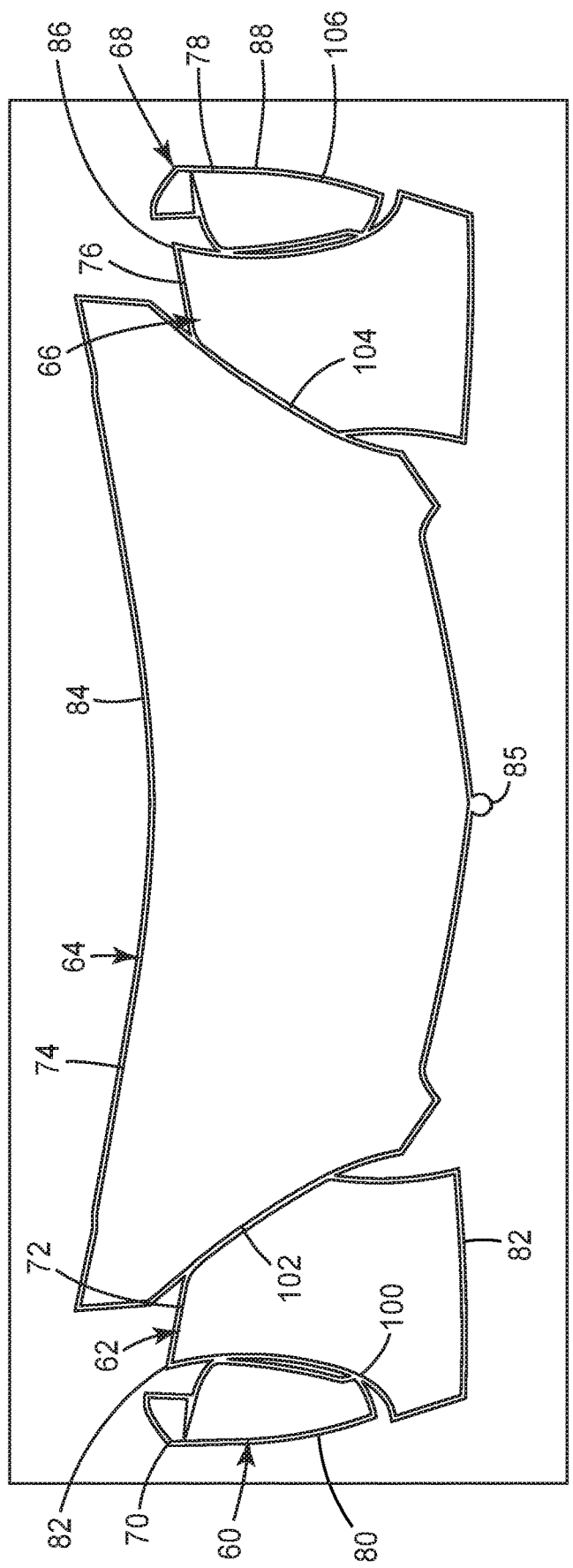
FIG. 6D is a schematic diagram showing the plurality of geometric shapes of FIG. 6C with the tags removed, in accordance with various embodiments.

The user can also manipulate the layout of geometric shapes 60-68 by rotating any of the geometric shapes or arranging them in two-dimensional space to minimize the amount of unused polymeric surface coating film in the final assembly. Once the user has finished manipulating the perimeters and shapes, the user can finalize the design. The finalized design is shown in FIG. 6D. As shown, perimeters 80-88 have been altered to create overlaps 100, 102, 104, and 106. A command is issued by the processor or the user to command the cutter to cut each of more geometric shapes 60-68 along each perimeters 70-88. This forms protective film assembly 10, which can be used as described herein.

The user can carry out method 50 after having been provided with an uncut roll of a protective film assembly including a polymeric surfacing film 14 disposed on backing 12. The uncut roll of protective film assembly can be provided directly by the manufacturer to the user. Along with the uncut roll of protective film assembly, the manufacturer can provide a program or software, as described herein, to the user. By providing the user with the uncut roll of protective film assembly as well as the software, the user can select any pattern and then cut the provided film using their own cutter.

EXAMPLES

Various embodiments of the present disclosure can be better understood by reference to the following Examples which are offered by way of illustration. The present disclosure is not limited to the Examples given herein.

Example 1

A computer-aided design (CAD) system including the capability to generate offset polygons or curves was used to select a geometric pattern for cutting a polymeric surfacing film for application to an automobile surface. The geometric pattern included an offset of 4 mm around the perimeter of the geometric shape. In this case, the geometric shape was a pattern for a film portion to cover the front bumper of a car.

A GRAPHTEC FC8000-100 cutting plotter (available from Graphtec America, Inc., Irvine, Calif.) connected to the CAD system was loaded with a 24 inch (61 cm) wide by 100 ft (30 meter) long roll of polymeric surfacing film available under the trade designation 3M PRO SERIES PAINT PROTECTION FILM (available from 3M Co., St. Paul, Minn.). The polymeric surfacing film was a polyurethane material with a flexible self-healing clearcoat and an adhesive backing having a thickness of 0.008 inch (about 200 micrometers) and a backing liner. The polymeric surfacing film was cut by the cutting plotter to provide a pattern-cut polymeric surfacing film having a 4 mm wide offset film portion surrounding the piece of pattern-cut surfacing film. The cutting plotter did not cut entirely through the backing, such that the pattern-cut surfacing film and the offset film portion were both still disposed on the backing, and the backing remained a single uncut uniform sheet.

The polymeric surfacing film was removed from the cutter/plotter, and the 4 mm wide portion of film surrounding the pattern-cut portion of polymeric surfacing film having the geometric shape (in this case, the film portion to cover the front bumper of the 2016 Chevrolet Equinox) was manually removed, enabling a simple manual removal of the pattern-cut portion of polymeric surfacing film for application to a vehicle.

Example 2

A computer-aided design (CAD) system running 3M Digital Designs CAD Software modified to include capability to generate offset polygons or curves was used to select a geometric pattern for cutting a polymeric surfacing film for application to an automobile surface. The geometric pattern included a uniform negative offset of 4 mm inside the perimeter of the geometric shape. In this case, the geometric shape was a pattern for a film portion to cover up to the hood of a car.

A GRAPHTEC FC8000-100 cutting plotter (available from Graphtec America, Inc., Irvine, Calif.) connected to the CAD system was loaded with a 24 inch (61 cm) wide by 100 feet (30 meter) long roll of polymeric surfacing film available under the trade designation 3M PRO SERIES PAINT PROTECTION FILM (available from 3M Co., St. Paul, Minn.). The polymeric surfacing film was a polyurethane material with a flexible self-healing clearcoat and an adhesive backing having a thickness of 0.008 inch (about 200 micrometers) and a backing liner. The polymeric surfacing film was cut by the cutting plotter to provide a pattern-cut polymeric surfacing film having a 4 mm-wide offset film portion inside the piece of pattern-cut surfacing film. The cutting plotter did not cut entirely through the backing, such that the pattern-cut surfacing film and the offset film portion were both still disposed on the backing, and the backing remained a single uncut uniform sheet.

The polymeric surfacing film was removed from the cutter/plotter, and the 4 mm-wide offset film portion inside the pattern-cut portion of polymeric surfacing film having the geometric shape (in this case, the film portion to cover hood of a car) was manually removed, enabling a simple perimeter reduction of the pattern-cut portion of polymeric surfacing film for application to a vehicle.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

Additional Embodiments

The following exemplary embodiments are provided, the numbering of which is not to be construed as designating levels of importance:

Embodiment 1 provides a method implemented by a computer processor for cutting a two-dimensional film and forming an assembly, the method comprising:
    selecting a pattern from a pattern data source, the pattern comprising:
        a continuous first perimeter defining a first geometric shape; and a continuous second perimeter spaced apart from and substantially congruent with the continuous first perimeter in at least one of an x and y direction, issuing at least one command to a cutter to cut the first geometric shape along each of the first perimeter and second perimeter in the two-dimensional film.

Embodiment 2 provides the method of Embodiment 1, wherein the processor issues the command to the cutter.

Embodiment 3 provides the method of any one of Embodiments 1 or 2, further comprising issuing a second command to generate the continuous second perimeter following selecting the pattern.

Embodiment 4 provides the method of any one of Embodiments 1 or 2, further comprising automatically generating the continuous second perimeter based on the geometry of the continuous first perimeter.

Embodiment 5 provides the method of any one of Embodiments 1-4, wherein the command to the cutter instructs the cutter to cut the film at a predetermined depth that is substantially equivalent to a thickness of the film.

Embodiment 6 provides the method of any one of Embodiments 1-4, wherein the command to the cutter instructs the cutter to cut the film at a predetermined depth that at least partially penetrates the backing.

Embodiment 7 provides the method of any one of Embodiments 1-6, wherein the first perimeter and the second perimeter are spaced from about 0.5 mm to about 20 mm apart.

Embodiment 8 provides the method of any one of Embodiments 1-7, wherein the first perimeter and the second perimeter are spaced from about 1.5 mm to about 12 mm apart.

Embodiment 9 provides the method of any one of Embodiments 1-8, wherein at least one of the geometric shapes comprises an interior feature defined by a continuous third perimeter defining the interior feature and a continuous fourth perimeter substantially congruent with the continuous third perimeter.

Embodiment 10 provides the method of any one of Embodiments 1-9, wherein the space between the first perimeter and the second perimeter is constant.

Embodiment 11 provides the method of any one of Embodiments 1-9, wherein the space between the first perimeter and the second perimeter is variable.

Embodiment 12 provides the method of any one of Embodiments 1-11, wherein the pattern includes a second geometric shape comprising a fifth perimeter defining the second geometric shape and a sixth perimeter spaced apart from and substantially congruent with the fifth perimeter.

Embodiment 13 provides the method of Embodiment 12, wherein the second perimeter of the first geometric shape and the sixth perimeter of the second geometric shape are positioned adjacent to each other.

Embodiment 14 provides the method of Embodiment 12, wherein at least a portion of the second perimeter of the first geometric shape and at least a portion of the sixth perimeter of the second geometric shape overlap.

Embodiment 15 provides the system of Embodiment 14, wherein the portion of the second perimeter of the first geometric shape and the portion of the sixth perimeter of the second geometric shape that overlap causes the second perimeter and the sixth perimeter to merge.

Embodiment 16 provides the method of any one of Embodiments 12-15, wherein the fifth perimeter and the sixth perimeter are spaced from about 0.5 mm to about 20 mm apart.

Embodiment 17 provides the method of any one of Embodiments 12-16, wherein the fifth perimeter and the sixth perimeter are spaced from about 1.5 mm to about 12 mm apart.

Embodiment 18 provides the method of any one of Embodiments 12-17, wherein the space between the fifth perimeter and the sixth perimeter is constant.

Embodiment 19 provides the method of any one of Embodiments 12-17, wherein the space between the fifth perimeter and the sixth perimeter is variable.

Embodiment 20 provides the method of any one of Embodiments 1-19, wherein at least one of:

a portion of the second perimeter is incongruent with a portion of the first perimeter; and a portion of the sixth perimeter is incongruent with a portion of the fifth perimeter.

Embodiment 21 provides the method of Embodiment 20, wherein at least one of the incongruent portion of the second perimeter and the incongruent portion of the sixth perimeter defines a tab.

Embodiment 22 provides the method of any one of Embodiments 1-21, further comprising modifying the arrangement of the first geometric shape on a virtual plane.

Embodiment 23 provides the method of Embodiment 22, wherein modifying the arrangement of the one of more geometric shapes comprises arranging the geometric spaces to substantially minimize areas of unused two-dimensional film when cut portions of the two-dimensional film corresponding to the first geometric shape is removed.

Embodiment 24 provides a system comprising:

a memory;

a processor coupled to the memory, the memory including instructions, which when performed by the processor cause the processor to perform the operations comprising:

selecting a pattern from a pattern data source, the pattern comprising:

a continuous first perimeter defining a first geometric shape; and a continuous second perimeter spaced apart from and substantially congruent with the continuous first perimeter in at least one of an x and y direction, and a cutter adapted to receive a command issued by the processor for cutting the first geometric shape along each of the first perimeter and second perimeter in a two-dimensional film.

Embodiment 25 provides the system of Embodiment 24, wherein the instructions are adapted cause the processor to perform the operation of generating the continuous second perimeter following selecting the pattern.

Embodiment 26 provides the system of any one of Embodiments 24 or 25, wherein the instructions are adapted cause the processor to perform the operation of generating the continuous second perimeter automatically when selecting the pattern.

Embodiment 27 provides the system of any one of Embodiments 24-26, wherein the command to the cutter instructs the cutter to cut the film at a predetermined depth that is equivalent to a thickness of the film.

Embodiment 28 provides the system of any one of Embodiments 24-26, wherein the command to the cutter instructs the cutter to cut the film at a predetermined depth that at least partially penetrates the backing.

Embodiment 29 provides the system of any one of Embodiments 24-28, wherein the first perimeter and the second perimeter are spaced from about 0.5 mm to about 20 mm apart.

Embodiment 30 provides the system of any one of Embodiments 24-29, wherein the first perimeter and the second perimeter are spaced from about 1.5 mm to about 12 mm apart.

Embodiment 31 provides the system of any one of Embodiments 24-30, wherein the space between the first perimeter and the second perimeter is constant.

Embodiment 32 provides the system of any one of Embodiments 24-30, wherein the space between the first perimeter and the second perimeter is variable.

Embodiment 33 provides the system of any one of Embodiments 24-32, wherein at least one of the geometric shapes comprises an interior feature defined by a continuous third perimeter defining the interior feature and a continuous fourth perimeter substantially congruent with the continuous third perimeter.

Embodiment 34 provides the system of any one of Embodiments 24-33, wherein the pattern includes a second geometric shape comprising a fifth perimeter defining the second geometric shape and a sixth perimeter spaced apart from and substantially congruent with the fifth perimeter.

Embodiment 35 provides the system of Embodiment 34, wherein the second perimeter of the first geometric shape and the sixth perimeter of the second geometric shape are positioned adjacent to each other.

Embodiment 36 provides the system of Embodiment 34, wherein at least a portion of the second perimeter of the first geometric shape and at least a portion of the sixth perimeter of the second geometric shape overlap.

Embodiment 37 provides the system of any one of Embodiments 34-36, wherein the fifth perimeter and the sixth perimeter are spaced from about 0.5 mm to about 20 mm apart.

Embodiment 38 provides the system of any one of Embodiments 34-36, wherein the fifth perimeter and the sixth perimeter are spaced from about 1.5 mm to about 12 mm apart.

Embodiment 39 provides the system of any one of Embodiments 34-36, wherein the space between the fifth perimeter and the sixth perimeter is constant.

Embodiment 40 provides the system of any one of Embodiments 34-36, wherein the space between the fifth perimeter and the sixth perimeter is variable.

Embodiment 41 provides the system of any one of Embodiments 34-40, wherein the second perimeter of the first geometric shape and the second perimeter of the second geometric shape are positioned adjacent to each other.

Embodiment 42 provides the system of any one of Embodiments 34-41, wherein at least a portion of the second perimeter of the first geometric shape and at least a portion of the sixth perimeter of the second geometric shape overlap.

Embodiment 43 provides the system of Embodiment 42, wherein the portion of the second perimeter of the first geometric shape and the portion of the sixth perimeter of the second geometric shape that overlap causes the second perimeter and the sixth perimeter to merge.

Embodiment 44 provides the system of any one of Embodiments 34-43, wherein the space between the fifth perimeter and the sixth perimeter is constant.

Embodiment 45 provides the system of any one of Embodiments 34-44, wherein the space between the fifth perimeter and the sixth perimeter is variable.

Embodiment 46 provides the system of any one of Embodiments 34-45, wherein at least one of:
a portion of the second perimeter is incongruent with a portion of the first perimeter; and
a portion of the sixth perimeter is incongruent with a portion of the fifth perimeter.

Embodiment 47 provides the system of Embodiment 46, wherein at least one of the incongruent portion of the second perimeter and the incongruent portion of the sixth perimeter defines a tab.

Embodiment 48 provides an assembly comprising:
a backing; and
a polymeric surfacing film adhered to the backing, the polymeric surfacing film comprising:
a continuous first cut defining a first geometric shape; and
a continuous second cut spaced apart from and substantially congruent with the continuous first cut in at least one of an x and y direction, wherein a portion of the polymeric surfacing film located between the first cut and the second cut is removable from the backing.

Embodiment 49 provides the assembly of Embodiment 48, wherein the first cut and the second cut are spaced from about 0.5 mm to about 20 mm apart.

Embodiment 50 provides the assembly of any one of Embodiments 48 or 49, wherein the first cut and the second cut are spaced from about 1.5 mm to about 12 mm apart.

Embodiment 51 provides the assembly of any one of Embodiments 48-50, wherein at least one of the geometric shapes comprises an interior feature defined by a continuous third cut defining the interior feature and a continuous fourth cut substantially congruent with the continuous third cut.

Embodiment 52 provides the assembly of any one of Embodiments 48-51, wherein the polymeric surfacing film comprises a second geometric shape different than the first geometric shape and comprising a fifth cut defining the second geometric shape and a sixth cut spaced apart from and substantially congruent with the first cut.

Embodiment 53 provides the assembly of Embodiment 52, wherein the second cut of the first geometric shape and the sixth cut of the second geometric shape are positioned adjacent to each other.

Embodiment 54 provides the assembly of any one of Embodiments 48-53, wherein the space between the first cut and the second cut is constant.

Embodiment 55 provides the assembly of any one of Embodiments 48-53, wherein the space between the first cut and the second cut is variable.

Embodiment 56 provides the assembly of any one of Embodiments 48-55, wherein the second cut defines at least one incongruent portion.

Embodiment 57 provides the assembly of Embodiment 56, wherein the incongruent portion defines a tab.

Embodiment 58 provides the assembly of any one of Embodiments 48-57, wherein the backing comprises a material chosen from a paper or a polyethylene liner, wherein the polyethylene liner optionally includes a release coating.

Embodiment 59 provides the assembly of any one of Embodiments 48-58, wherein the polymeric surfacing film comprises a polyurethane.

Embodiment 60 provides the assembly of any one of Embodiments 48-59, wherein at least one of the first and second geometric shapes is a paint protection polymeric surfacing film, a window tint polymeric surfacing film, or a component thereof.

Embodiment 61 provides the assembly of any one of Embodiments 48-60, wherein the backing is free of penetration by at least one of the first cut and the second cut.

Embodiment 62 provides the assembly of any one of Embodiments 48-60, wherein the backing is at least partially penetrated by at least one of the first cut and second cut.

Embodiment 63 provides a method of making the assembly according to any one of Embodiments 48-62, the method comprising:
providing or receiving the polymeric surfacing film;
cutting the polymeric surfacing film along a first perimeter of the geometric shape; and
cutting the polymeric surfacing film along a second perimeter spaced apart and substantially congruent with the first perimeter.

Embodiment 64 provides a method of using the assembly of any one of Embodiments 48-62, the method comprising:
providing or receiving the assembly; and
removing the portion of the polymeric surfacing film located between the first cut and the second cut of the first geometric shape from the backing.

Embodiment 65 provides the method of using the assembly of Embodiment 64, further comprising removing the first geometric shape from the backing.

Embodiment 66 provides the method of using the assembly of Embodiment 65, further comprising applying the first geometric shape to a substrate.

Embodiment 67 provides the method of using the assembly of Embodiment 66, wherein the substrate is selected from a section of a vehicle body or a window.

Embodiment 68 provides the method of using the assembly of Embodiment 67, wherein the section of the vehicle is chosen from a hood, a fender, a mirror, a door, a roof, a panel, a portion thereof, a hull, a propeller, a blade, an airfoil, fuselage, or a combination thereof.

Embodiment 69 provides the method of any one of Embodiments 65-68, further comprising using remaining portions of the polymeric surfacing film attached to the backing to cut additional geometric shapes.

Embodiment 70 provides the method of Embodiment 69, wherein a larger portion of the polymeric surfacing film can be used to cut additional geometric shapes than a corresponding polymeric surfacing film that is free of the second cut.

Embodiment 71 provides the method of any one of Embodiments 64-70 further comprising pulling the tab to initiate removal of the portion of the polymeric surfacing film located between the first cut and the second cut of the first geometric shape.

Embodiment 72 provides the assembly of any one of Embodiments 48-53, wherein the space between the first cut and the second cut is negative based on the second cut being smaller than the first cut.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An assembly comprising:
a backing; and
a polymeric surfacing film adhered to the backing, the polymeric surfacing film being at least partially self-healing and comprising:
a continuous first cut defining a first geometric shape; and
a continuous second cut spaced apart from and substantially congruent with the continuous first cut in at least one of an x and y direction such that at least 80% of the continuous second cut is congruent with that of the continuous first cut, wherein a portion of the polymeric surfacing film located between the first cut and the second cut is removable from the backing.

2. The assembly of claim 1, wherein the first cut and the second cut are spaced from about 0.5 mm to about 20 mm apart.

3. The assembly of claim 1, wherein the first geometric shape comprises an interior feature defined by a continuous third cut defining the interior feature and a continuous fourth cut substantially congruent with the continuous third cut.

4. The assembly of claim 1, wherein the polymeric surfacing film comprises a second geometric shape different than the first geometric shape and comprising a fifth cut defining the second geometric shape and a sixth cut spaced apart from and substantially congruent with the first cut.

5. The assembly of claim 1, wherein the second cut defines at least one incongruent portion.

6. The assembly of claim 5, wherein the incongruent portion defines a tab.

7. The assembly of claim 1, wherein the backing comprises a material chosen from at least one of a paper and a polyethylene liner, wherein the polyethylene liner optionally includes a release coating.

8. The assembly of claim 1, wherein the polymeric surfacing film comprises a polyurethane.

9. The assembly of claim 1, wherein at least one of the first and second geometric shapes is a paint protection polymeric surfacing film, a window tint polymeric surfacing film, or a component thereof.

* * * * *